Figure 1:
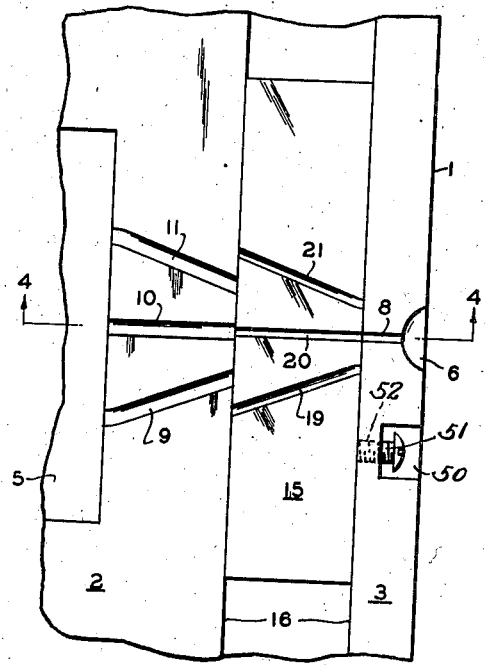

April 14, 1942.   J. S. REID   2,279,380
INJECTION MOLD GATING
Filed Jan. 28, 1939   3 Sheets-Sheet 1

INVENTOR.
JAMES S. REID
BY
HIS   ATTORNEY.

INVENTOR.
JAMES S. REID
BY
HIS ATTORNEY.

INVENTOR.
JAMES S. REID.
BY
HIS ATTORNEY.

Patented Apr. 14, 1942

2,279,380

UNITED STATES PATENT OFFICE 2,279,380

INJECTION MOLD GATING

James S. Reid, Shaker Heights, Ohio, assignor, by mesne assignments, to The Standard Products Company, Port Clinton, Ohio, a corporation of Ohio Application January 28, 1939, Serial No. 253,362

11 Claims. (Cl. 18—42)

This invention relates to an improvement in the molding of organic plastic materials, and particularly in the molding of thermoplastic materials by injection of the material into a mold cavity formed between suitable separable dies.

In injection molding of organic plastic materials, such for example as cellulose acetate, the mold cavities in the die blocks for different articles to be molded vary greatly in shape and size. Each variation presents a specifically different problem as to the most desirable location for the outlet or outlets of the gate or gates through which the material is to be introduced into the cavity. The die maker usually can be substantially certain that good results will follow from the introduction of the plastic in one or certain ones of a few gate outlet positions; but he cannot tell in advance of making one or more test injections which is or are most effective or desirable from a standpoint of producing acceptable articles in quantity. For each eventual single entrance gate, one can machine two or more gate passages in one or both of the coacting dies between which the cavity is formed and test them for effectiveness, using for instance, temporary plugs in all except one of each group. After determination by such trial of the most desirable gate outlet position, the less effective passage or passages can then be closed as by metal built up by welding, followed by subsequent remachining to finish the die or dies at the welded regions. Another alternative is to form only one gate at each presumably desirable region, and then, if found ineffective, to remove the die or dies from the press and remachine it or them to form new gate outlets, closing those found ineffective as by welding. Such cut-and-try expedients are very costly due to the care required in the machining operations and in the mounting and remounting of the dies accurately on the press.

In view of the above, an object of the present invention is to provide an effective solution to the problem above stated; and more specifically, to provide a system, method, and/or mold apparatus which will enable predetermination of a sufficient number of gate outlets practically to insure the desired results by the use of a predetermined number of outlet positions, and subsequent selection of such number to the exclusion of the other or others, but without having subsequently to perform any machining operation, or to remove the die or dies from the press in order to block the gate passage or passages which is or are not to be utilized in production molding.

Other objects and features of the invention will become apparent from the following description which relates to the accompanying drawings showing exemplary forms of mold or die apparatus embodying features of the invention. The essential characteristics are summarized in the claims.

Figure 2:
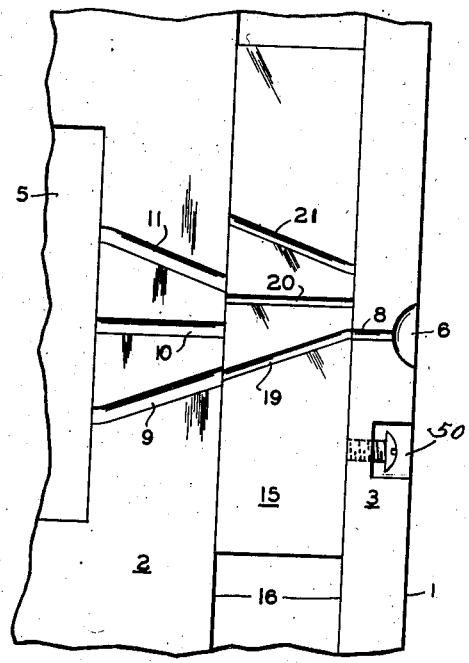
Figure 3:
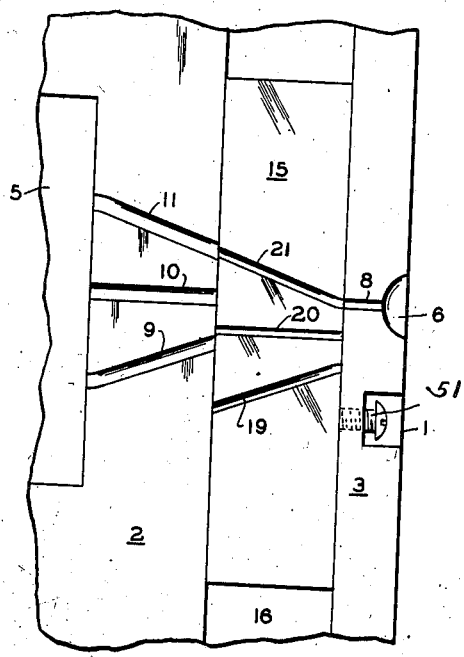
Figure 4:
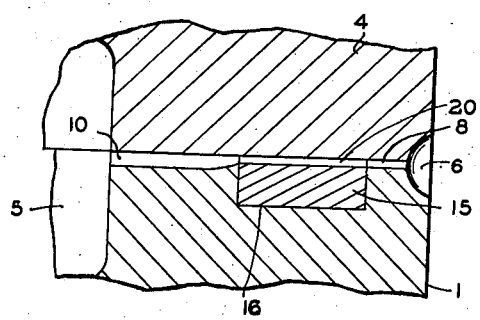
Figure 5:
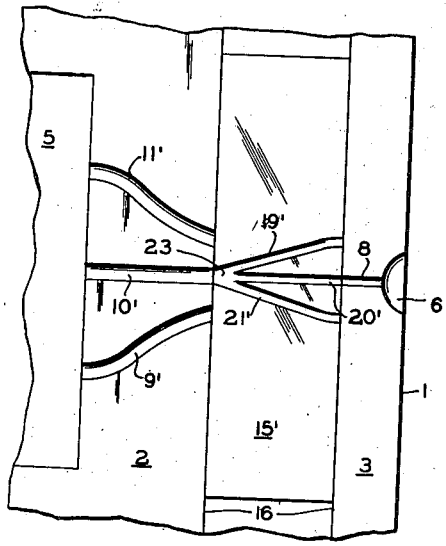
Figure 6:
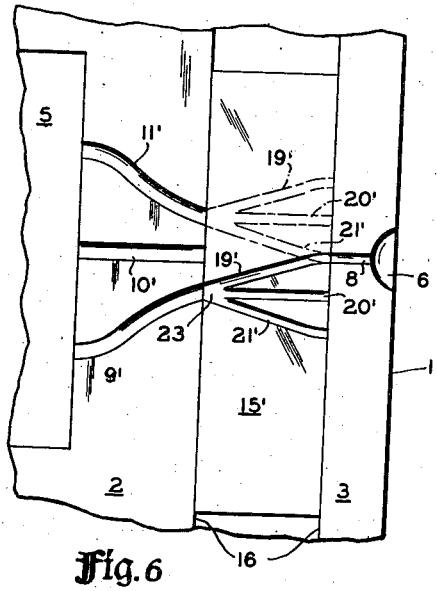
Figure 7:
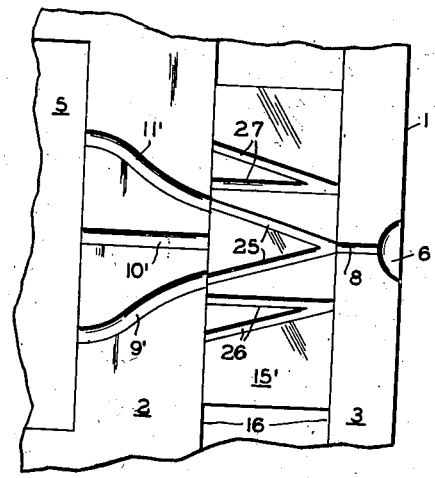
Figure 8:
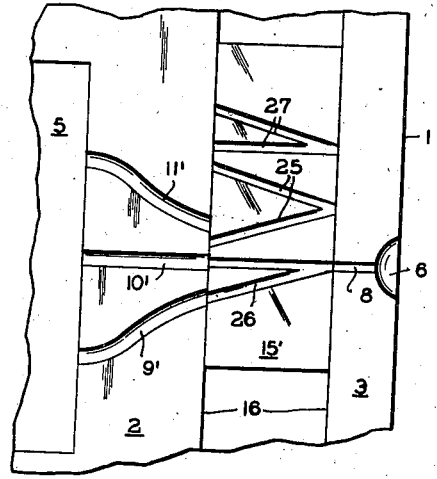
Figure 9:
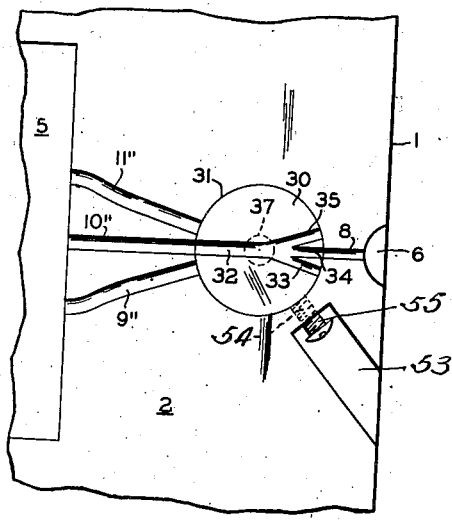
Figure 10:
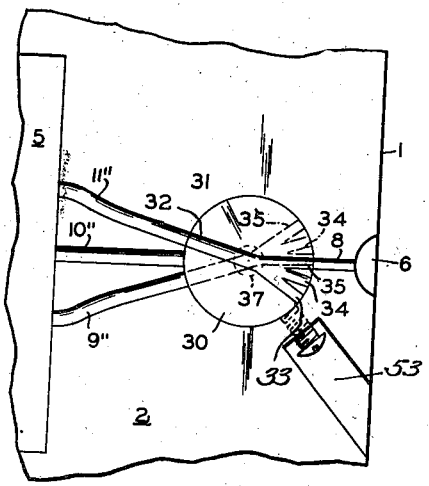
Figure 11:
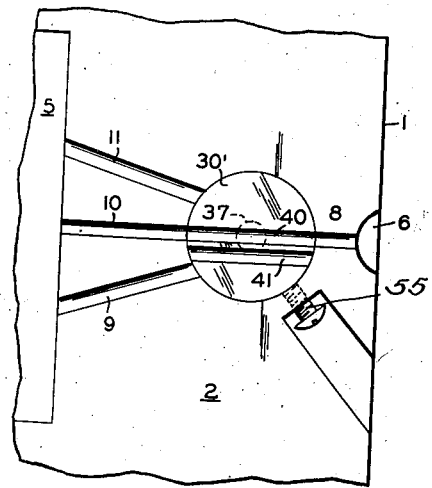
Figure 12:
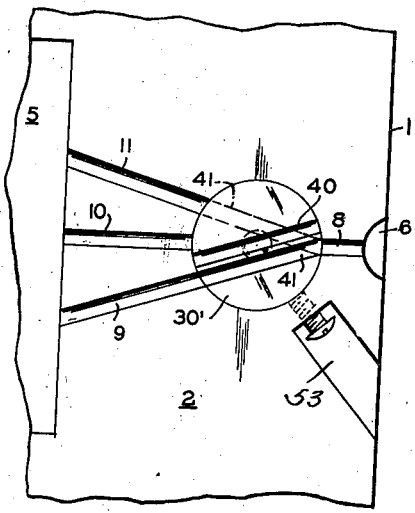

In the drawings, Figs. 1, 2 and 3 are fragmentary plan views of marginal portions of a die and a portion of its cavity, showing one arrangement of gate passages and selection means for use thereof. Fig. 4 is a fragmentary sectional view as indicated by the line 4—4 on Fig. 1. Figs. 5 and 6 are views corresponding generally to Figs. 1 to 3 showing a modified arrangement of selection passages in an adjustable die part. Figs. 7 and 8 are views corresponding generally to Figs. 5 and 6 showing a further modification in the selection passages of the adjustable part. Figs. 9 and 10 are views corresponding generally to Figs. 5 and 6 showing a further modified form of adjustable part for gate selection, and Figs. 11 and 12 are views corresponding generally to Figs. 9 and 10 showing a further modification of the specific form of selection means of Figs. 9 and 10.

Referring to Figs. 1 to 4, a portion of a die block 1 is shown on which co-planar surfaces 2 and 3 are parting plane faces at a marginal portion of the die adjacent the cavity 5. The cavity can be of any possible shape and can be formed in one or more of the coacting dies. For convenience in ejection of finished pieces from the molds, the gate and sprue passages preferably are formed at the separation plane of the mold, as in said co-planar surfaces 2 and 3 of one of the dies; a sprue passage being indicated at 8. 6 indicates the injection-nozzle receiving indentation in the side of the mold, and this may be formed partially in the die block 1 and partially in the coacting die 4, as shown in Fig. 4, in registration with the sprue passage 8.

Generally opposite the sprue passage 8 is a plurality of gate passages indicated at 9, 10 and 11 which are to receive the plastic material injected through the sprue passage to carry the same into the cavity 5. These passages 9, 10 and 11 can be formed in one only of the mold blocks, as in the surface 2, and the outlets of the different passages are at those regions, one of which, as determined by the skill of the engineer or die maker, is likely to be the optimum location for entrance of the plastic into the mold to secure the best results with the particular cavity of it and the kind of material to be injected. An experienced die maker can usually find a suitable location if given as many as three choices.

In order to enable selective use of the gate passages 9, 10 and 11 relative to the sprue passage 8, a die part 15, shown as a rectangular block, may be slidably arranged as in a channel 16 complementary to the block 15 so that the block can be slid along the channel to different operating positions. The block 15 has a plurality of gate-passage-forming channels 19, 20 and 21 which, in the arrangement shown by Figs. 1 to 3, diverge in suitable relationship so that by shifting of the block into three positions, the sprue passage can be connected with the three passages 9, 10 and 11 selectively and exclusively. In the position of the block 15 shown in Fig. 1, the passage 20 registers with passages 8 and 10, and the passages 9, 11 and 19 and 21 are rendered inoperative; 19 and 21 being completely cut off at both ends. In Fig. 2, the passage 19 registers with 8 and 9, and the other passages are rendered inoperative or blocked. In Fig. 3, the passage 11 only is rendered operative by registration of the selection passage 21 with the sprue and gate passages 8 and 11. With the arrangement just described, any number of test injections may be made before fastening of the part 15 in place, and the most suitable injection point, as to the cavity, thus determined. The block 15 is then locked in place by suitable means, such as with metal built up by welding at the base or sides of the channel and adjacent the ends of the block 15. Locking screws could also be used to fix the block in final position. One such locking arrangement is shown in Figs. 1, 2, and 3. A slot 50 is machine in the face 3 of die block 1, to provide clearance for the head of a set screw 51 which seats in a threaded bore 52 in die block 1, said bore extending from the bottom of the slot to channel 16. When the desired alignment of any particular set of passages is secured, the screw 51 is turned inwardly to bear tightly against insert 15 and hold it in position as long as necessary. This arrangement permits any suitable lateral adjustment of insert block 15.

If desired, the ones of the channels 9, 10 and 11 which are not to be used can be left open so as to serve as gas pockets, or may be closed at their outlets, against backing up of material thereinto from the mold cavity, by blocks which fit nicely into the channels and just fill them. Such could be welded or fastened into place without requiring any great amount of labor and without having to dismount the die block 1 from the press.

In Fig. 5, the passages 9', 10' and 11' are arranged similarly to the passage portions 9, 10, and 11 of the main die block 1, but the selection passage channels of the adjustable block 15', indicated at 19', 20' and 21', converge toward the inlet regions of the passages 9' to 11' and have a common outlet designated 23. Thus, with the block 15' positioned as shown in Fig. 5, the central gate passage 10' is served from the sprue passage 8, and, in the full line indications in Fig. 6 of the selection passages of the block 15', the passage 9' is served. In the broken line position of the selection passages of Fig. 6, the gate passage 11' is served. When using the system according to Figs. 5 and 6, the selection passages of the block 15', which are not eventually to be used, can be welded shut at or near the common outlet 23 and the block 15' then remachined for proper finish. This requires only the removal and replacement of the block 15', but does not require disturbing either main die block.

Figs. 7 and 8 are illustrative of further selection possibilities affordable by the system hereof. In Fig. 7, the selection block 15' has a plurality of sets of selection passages, the passage portions of each of which sets are arranged to cooperate with a selected plurality of the gate passages 9' to 11'. In the setting of the block shown by Fig. 7, the passages 9' and 11' are served by means of a set of diverging passages 25 of the block 15. In another setting, as shown by Fig. 8, the passages 9' and 10' are served through selection passages 26. In still another setting of the block (not shown), the passages 10' and 11' can be served as by the set of passages 27. Additionally, the block may have, on its under side or in suitable location, e. g. beyond the sets 25, 26 and 27, passages arranged, for instance as in Fig. 1, to enable selection of one only of the passages 9', 10' and 11' for communication with the sprue passage 8 to the exclusion of both the others. The additional passages in the block 15' are not shown in Figs. 7 and 8.

Figs. 9 and 10 are principally to illustrate that the gate selection can be accomplished by other than a rectilinear movement of the selection part. As shown, a circular block 30 sets in a complementary recess 31 communicating with the face 2 of the mold at the parting line, the block having its top face flush with the surface 2. Such block can be turnable to different positions so that the sprue passage 8 serves the gate passages 9'', 10'' or 11''. As shown by Fig. 9, the selection passages of the block 30 comprise a discharge passage portion 32 and branch portions 33, 34 and 35 which, upon turning of the block, can cause communication of one of these portions 33 to 35 with the sprue passage 8, and simultaneously, the portion 32 with one only of the passages 9'' to 11''. Fig. 9 shows the setting of the circular block 30 for serving the passage 10'', and Fig. 10, in solid and broken lines, indicates the other positions of the block 30 for serving the other gate passages 9'' and 11''. A hole 37, Fig. 9, for a knock-out pin can be located on the under side of the die block in line with the recess into which the block 30 is fitted, whereby to enable the circular block 30 to be taken out easily, and turned and reseated in the various positions. The circular block can be secured permanently into place, after the trial injections, by a suitable set screw or by welding as at the back, through the hole 37. Such a locking arrangement is shown in Figs. 9, 10, 11 and 12. A slot 53 is machined in the face 2 of die block 1. A threaded holes 54 extends from the bottom of said slot to the cylindrical bore which carries the circular block 30 (Figs. 9 and 10) or 30' (Figs. 11 and 12). A set screw 55 seats in said threaded hole. When the desired alignment of any particular set passages is secured, the screw 55 is turned inwardly to bear tightly against insert 30 or 30' and hold said insert in position as long as necessary. This arrangement permits any desired rotational adjustment of the circular insert block.

Referring further to Fig. 9, it will be apparent that upon each injection of material into the mold cavity 5, the branch portions 33 and 35 will be filled or partially filled by gate material. This same condition occurs with the use of selection passages such as 19', 20' and 21' which converge toward the entrance region of the gates 9' to 11'.

In the use of the circular block, waste of plastic material and branching flow of plastic in the gating can be obviated by making the selection channels in the circular block as at 40 and 41, Figs. 11 and 12. The channel 40 is diametrally arranged with respect to the axis of the block 30' and the channel 41 is parallel to 40 and at one side of the latter, so that with the block 30' turned to the position shown on Fig. 12 (channels 40 and 41 are illustrated in solid lines), the gate 9 is served and the others cut off. With the block 30' nearly reversed in position circumferentially (see broken line illustration of the channel 41), the gate 11 is served through 41 while the others are blocked. Optionally, the channel 41 could be formed on the under face of the block 30' and the block turned over to enable such channel to be used.

While the selection devices 15, 30, etc., are shown at the parting plane of the mold and in only one of the die blocks, it is obvious that the selection blocks and channels can be placed in both molds and can be located in positions other than at the parting plane. In many instances, it is necessary to inject the material from a direction substantially normal to the parting plane, and in such event, the gates corresponding to 9, 10 and 11 would simply be bores through solid portions of a die block leading into the cavity at apparently desirable locations, and the selection block would occupy an appropriately shaped bore in the die block. The selection passages would be rendered communicable with the gate bores and a sprue bore corresponding in operative effect to 8 by appropriate adjustment of the selection block. It is not deemed necessary to illustrate this construction in view of the forms already described. Such selection block in a bore as just described could be shiftable longitudinally in the bore, or turnable in the bore to align the selection passages with the gate and sprue passages, or both.

I claim:

1. In a mold for forming articles from hardenable plastic material and comprising separable mold members shaped to provide a cavity between them, each having a parting plane face complementary to the parting plane face of the other when the mold is closed, one of said members having a plurality of gate channels leading to the mold cavity and a single sprue passage leading from an exposed portion of the mold member toward said plurality of gate channels, said mold member having an enlarged recess between the discharge end of the sprue passage and the receiving ends of the gate channels, a block in said recess substantially filling the same but adjustable to different positions in the recess, said block having through passages, one of the through passages communicating at respective ends exclusive with one of the gate channels and with the sprue passage in one setting of the block and another of said through passages communicating at respective ends exclusively with a different gate channel and said sprue passage in another setting of the block, whereby the block may be fixed in position after selective testing of the gate channels as described and thereafter will supply all material injected through the sprue passage to the selected gate channel.

2. A mold for forming articles from organic plastic material by injection molding and comprising separable mold members having mutually cooperating meeting faces at a mold parting plane, said meeting faces being shaped to provide therebetween a mold cavity, one of said members having in its said meeting face a recess and supporting therein an adjustable block, said member also having a plurality of gate passages leading from different portions of said mold cavity to different portions of said recess, and said member having a sprue passage leading from said recess to the exterior surface of said mold member, and passage means in said block adapted to be adjustably registered with said sprue and at least one of said gate passages while out of registry with at least one other gate passage.

3. A mold structure as in claim 2 wherein means is provided for fixing said adjustable block in position when registration is effected between said sprue passage and the most desirable gate passage.

4. A mold structure as in claim 2 wherein one passage only in said adjustable block is simultaneously in registry with said sprue passage and one gate passage to said mold cavity.

5. A mold structure as in claim 2 wherein said sprue passage and said gate passages are formed in the parting plane surface of said mold member and wherein said passage means in said block is formed in a surface of said block coplanar with said mold parting plane.

6. A mold structure as in claim 2 wherein said adjustable block has a plurality of channels formed only on a face which is coplanar with the parting plane of the mold members, the corresponding cooperating surface of the other mold section being ungrooved whereby said channels become completely isolated from each other when the mold members are brought together into molding position.

7. In a mold for forming articles from organic plastic material by injection molding and comprising separable mold members having mutually cooperating meet faces at a mold parting plane, and said meeting faces being shaped to provide therebetween a mold cavity, one of said members having in its respective meeting face a recess and having therein a rotatably adjustable block, said mold member also having a plurality of gate passages leading from said mold cavity to said recess, and having a sprue passage leading from said recess to the exterior surface of said mold member, and passage means in said block adapted to adjustably register with said sprue and with at least one of said gate passages while out of registry with at least one other gate passage, with said sprue and with said two gate passages.

8. A mold structure as in claim 7 wherein said sprue and said gate passages are formed in the parting plane surface of said mold member and wherein said gassage means in said adjustable block is formed in a surface of said block coplanar with said parting plane.

9. In a mold for forming articles from organic plastic material by injection molding, and comprising separable mold members having mutually cooperating faces meeting at a mold parting plane, said meeting faces being shaped to provide therebetween a mold cavity, one of said members having in its meeting face a recess, and supporting therein a rotatably adjustable block, said mold member also having a plurality of gate passages leading from said mold cavity to said recess, and having, further, a sprue passage leading from said recess to the exterior surface of said mold member, and a plurality of passages in said adjustable block, distinct and noncommunicating with respect to each other, said block being rotatably adjustable so that when one of said block passages is in registry with the said sprue passage and a gate passage, any other passage in said adjustable block is out of registry with said sprue and any gate passage.

10. A mold for forming articles from organic plastic material by injection molding, and comprising separable mold members having mutually cooperating meeting faces at a mold parting plane, said meeting faces being shaped to provide therebetween a mold cavity, one of said members having in its said meeting face an elongated recess, and supporting therein a slidably adjustable block, said member also having a plurality of gate passages leading from different portions of said mold cavity to different portions of said recess and said member having a sprue passage leading from said recess to the exterior surface of said mold member, and passage means in said block adapted to be adjustably registered with said sprue and at least one of said gate passages while out of registry with at least one other gate passage.

11. A mold for forming articles from organic plastic material by injection molding, and comprising separable mold members having mutually cooperating meeting faces at a mold parting plane, said meeting faces being shaped to provide therebetween a mold cavity, one of said members having in its said meeting face an elongated recess, and supporting therein a slidably adjustable block, a plurality of passages in said block arranged in paired relationship, said member also having at least three gate passages leading from different portions of said mold cavity to different portions of said recess, and said member having a sprue passage leading from said recess to the exterior surface of said mold member, any two gate passages being adapted to be placed in communication with said sprue passage by slidably adjusting said block to place an appropriate pair of passages therein in simultaneous registry with said sprue and with said two gate passages.

JAMES S. REID.

CERTIFICATE OF CORRECTION.

Patent No. 2,279,380.   April 14, 1942.

JAMES S. REID.

It is hereby certified that error appears in the printed specification of the above numbered patent requiring correction as follows: Page 2, second column, line 57, for "holes" read --hole--; page 3, first column, line 61, claim 1, for "exclusive" read --exclusively--; and second column, line 53, claim 7, strike out "with said sprue and with said two gate passages."; line 57, claim 8, for "gassage" read --passage--; and that the said Letters Patent should be read with this correction therein that the same may conform to the record of the case in the Patent Office.

Signed and sealed this 26th day of May, A. D. 1942.

Henry Van Arsdale,
Acting Commissioner of Patents.

(Seal)